(12) United States Patent
Camp et al.

(10) Patent No.: US 9,290,594 B2
(45) Date of Patent: Mar. 22, 2016

(54) SYSTEM AND PROCESS FOR OLEFIN POLYMERIZATION

(71) Applicants: Gary A. Camp, Lake Jackson, TX (US); Mitch Juneau, Pearland, TX (US); Robert D. Swindoll, Clute, TX (US)

(72) Inventors: Gary A. Camp, Lake Jackson, TX (US); Mitch Juneau, Pearland, TX (US); Robert D. Swindoll, Clute, TX (US)

(73) Assignee: Dow Global Technologies LLC, Midland, MI (US)

( * ) Notice: Subject to any disclaimer, the term of this patent is extended or adjusted under 35 U.S.C. 154(b) by 89 days.

(21) Appl. No.: 14/344,017

(22) PCT Filed: Sep. 25, 2012

(86) PCT No.: PCT/US2012/057018
§ 371 (c)(1),
(2) Date: Mar. 10, 2014

(87) PCT Pub. No.: WO2013/052308
PCT Pub. Date: Apr. 11, 2013

(65) Prior Publication Data
US 2014/0256900 A1    Sep. 11, 2014

Related U.S. Application Data

(60) Provisional application No. 61/543,107, filed on Oct. 4, 2011.

(51) Int. Cl.
| | | |
|---|---|---|
| *B01J 19/20* | (2006.01) | |
| *B01J 19/00* | (2006.01) | |
| *C08F 210/00* | (2006.01) | |
| *C08F 210/16* | (2006.01) | |
| *C08F 10/00* | (2006.01) | |
| *C08F 2/01* | (2006.01) | |

(52) U.S. Cl.
CPC ............... *C08F 210/16* (2013.01); *C08F 2/01* (2013.01); *C08F 10/00* (2013.01); *B01J 2219/00006* (2013.01)

(58) Field of Classification Search
CPC .......... C08F 10/00; C08F 210/16; C08F 2/01; C08F 2/00; C08F 210/14; B01J 2219/00006
USPC ................................ 526/348.2; 422/134, 138
See application file for complete search history.

(56) References Cited

U.S. PATENT DOCUMENTS

| | | |
|---|---|---|
| 4,188,290 A | 2/1980 | Graham et al. |
| 4,406,836 A | 9/1983 | Miserlis |
| 6,420,516 B1 | 7/2002 | Tau et al. |
| 6,639,049 B2 | 10/2003 | Weitzel |
| 2008/0281040 A1 | 11/2008 | Kiss et al. |

FOREIGN PATENT DOCUMENTS

| | | | |
|---|---|---|---|
| EP | 0193263 | * | 9/1986 |
| EP | 193263 A1 | | 9/1986 |
| WO | 2007014842 | | 2/2007 |
| WO | 2007134837 | | 11/2007 |
| WO | 2012044291 A1 | | 4/2012 |
| WO | 2012044293 A1 | | 4/2012 |
| WO | 2012134700 A2 | | 10/2012 |

OTHER PUBLICATIONS

PCT/US2012/057018, International Search Report and Written Opinion of the International Searching Authority. dated Nov. 13, 2012, 31 pages.
PCT/US2012/057018, International Preliminary Report on Patentability, date of issuance Apr. 8, 2014, 6 pages.
Chinese First Office Action dated Aug. 19, 2015 for Chinese Application No. 201280048761.3, 10 pages.

* cited by examiner

*Primary Examiner* — William Cheung

(57) ABSTRACT

The present invention provides a system and process for olefin polymerization. The inventive system and process for olefin polymerization facilitate lower operating vacuum pressures in the polymer recovery system by requiring at least two sequential condensing units, wherein at least one of the condensing units operates at significantly lower temperature ranges than the temperature ranges at which the current systems operate.

2 Claims, No Drawings

SYSTEM AND PROCESS FOR OLEFIN POLYMERIZATION

CROSS-REFERENCE TO RELATED APPLICATIONS

This application is a non-provisional application claiming priority from the U.S. Provisional Patent Application No. 61/543,107, filed on Oct. 4, 2011, entitled "SYSTEM AND PROCESS FOR OLEFIN POLYMERIZATION," the teachings of which are incorporated by reference herein, as if reproduced in full hereinbelow.

FIELD OF INVENTION

The instant invention relates to a system and process for olefin polymerization.

BACKGROUND OF THE INVENTION

Olefin polymerization is typically conducted in one or more reactors, connected in parallel or series, in the presence of one or more catalyst systems and one or more solvents. Subsequent to the polymerization process, the product mixture is typically contacted with one or more catalyst deactivating agents and/or one or more acid scavenger agents to deactivate the one or more catalyst systems and/or minimize the impact of certain byproducts. Most of the solvent and byproducts are separated from the product mixture leaving only olefin polymers products and very small amounts of solvent and/or byproducts in the product mixture. However, the presence of even small amounts of solvent and/or byproducts in the product mixture can lead to the release of significant amount of volatile organic compounds into the environment because of their accumulation effect.

Therefore, it is desirable to design a system and/or process for olefin polymerization, wherein the amounts of solvents and/or byproducts in the olefinic product mixtures is substantially reduced thereby decreasing the amount of volatile organic compounds released into the environment.

SUMMARY OF THE INVENTION

The present invention provides a system and process for olefin polymerization. The inventive system and process for olefin polymerization facilitate lower operating vacuum pressures in the polymer recovery system by requiring at least two sequential condensing units, wherein at least one of the condensing units operates at significantly lower temperature ranges than the temperature ranges at which the current systems operate.

The inventive olefin polymerization system comprises: (a) one or more reactors for polymerizing one or more olefin monomers in the presence of one or more catalyst systems and solvent to produce a polymer-solvent-catalyst mixture; (b) one or more means for conveying the polymer-solvent-catalyst mixture; wherein the one or more means for conveying further provide the means for deactivating the one or more catalyst systems in the polymer-solvent-catalyst mixture and means for contacting the polymer-solvent-deactivated catalyst mixture with an acid scavenger, whereby a polymer-solvent-acid mixture is formed; (c) one or more means for heating the polymer-solvent-acid mixture, wherein the one or more means for heating is in communication with the one or more reactors via the one or more means for conveying of the polymer-solvent-catalyst mixture; (d) means for conveying the heated polymer-solvent-acid mixture; (e) one or more means for removing at least 60 percent of the solvent from the heated polymer-solvent-acid mixture, whereby a polymer-reduced solvent-acid mixture is formed, and wherein the one or more means for removing at least 60 percent of the solvent is in communication with the one or more means for heating; (f) one or more means for removing substantially the remaining portion of the solvent from the polymer-reduced solvent-acid mixture, whereby a solvent-acid mixture is formed, and wherein said one or more means for removing substantially the remaining portion of said solvent is in communication with said one or more means for removing at least 60 percent of said solvent; (g) one or more means for removing said acid from the solvent-acid mixture; whereby a substantially acid free solvent is formed, and wherein the one or more means for removing said acid is in communication with the one or more means for removing substantially the remaining portion of the solvent; and (h) one or more means for removing the substantially acid free solvent in communication with the one or more means for removing said acid.

The inventive process for olefin polymerization comprises the steps of: (1) polymerizing one or more olefin monomers in the presence of one or more catalyst systems and solvent to produce a polymer-solvent-catalyst mixture in one or more reactors; (2) deactivating the one or more catalyst systems in said polymer-solvent-catalyst mixture; (3) contacting the polymer-solvent-deactivated catalyst mixture with an acid scavenger; (4) thereby forming a polymer-solvent-acid mixture; (5) heating the polymer-solvent-acid mixture; (7) removing at least 60 percent of the solvent from the heated polymer-solvent-acid mixture; (8) thereby forming a polymer-reduced solvent-acid mixture; (9) removing substantially the remaining portion of the solvent from the polymer-reduced solvent-acid mixture; (10) thereby forming a solvent-acid mixture; (11) removing the acid from the solvent-acid mixture; (12) thereby forming a substantially acid free solvent; (13) removing the substantially acid free solvent; (14) recycling at least a portion of said substantially acid free solvent back into the process for olefin polymerization; and (15) thereby forming an olefin polymer having less than 800 parts by weight of one or more volatile organic compounds based on one million parts of the polymer.

DETAILED DESCRIPTION OF THE INVENTION

The present invention provides a system and process for olefin polymerization. The inventive olefin polymerization system comprises: (a) one or more reactors for polymerizing one or more olefin monomers in the presence of one or more catalyst systems and solvent to produce a polymer-solvent-catalyst mixture; (b) one or more means for conveying the polymer-solvent-catalyst mixture; wherein the one or more means for conveying further provide the means for deactivating the catalyst in the polymer-solvent-catalyst mixture and means for contacting the polymer-solvent-deactivated catalyst mixture with an acid scavenger, whereby a polymer-solvent-acid mixture is formed; (c) one or more means for heating the polymer-solvent-acid mixture, wherein the one or more means for heating is in communication with the one or more reactors via the one or more means for conveying of the polymer-solvent-catalyst mixture; (d) means for conveying the heated polymer-solvent-acid mixture; (e) one or more means for removing at least 60 percent of the solvent from the heated polymer-solvent-acid mixture, whereby a polymer-reduced solvent-acid mixture is formed, and wherein the one or more means for removing at least 60 percent of the solvent is in communication with the one or more means for heating; (f) one or more means for removing substantially the remaining portion of the solvent from the polymer-reduced solvent-acid mixture, whereby a solvent-acid mixture is formed, and wherein the one or more means for removing substantially the remaining portion of the solvent is in communication with the one or more means for removing at least 60 percent of the solvent; (g) one or more means for removing the acid from the solvent-acid mixture; whereby a substantially acid free solvent is formed, and wherein the one or more means for removing the acid is in communication with the one or more means for removing substantially the remaining portion of the solvent; and (h) one or more means for removing said substantially acid free solvent in communication with the one or more means for removing the acid.

The one or more reactors for polymerizing one or more olefin monomers can, for example, be a continuous solution polymerization reactor consisting of a liquid full, non-adiabatic, isothermal, circulating, and independently controlled loop, or in the alternative, two or more continuous solution polymerization reactors including two or more liquid full, non-adiabatic, isothermal, circulating, and independently controlled loops operating, for example, in a series or parallel configuration.

The one or more means for conveying the polymer-solvent-catalyst mixture include, but are not limited to, pipes, tubes, and conduits. The one or more means for conveying further provide the means for deactivating the one or more catalyst systems in the polymer-solvent-catalyst mixture and the means for contacting the polymer-solvent-deactivated catalyst mixture with an acid scavenger, whereby a polymer-solvent-acid mixture is formed. Means for deactivating catalyst include, but are not limited to, one or more injection ports for deactivating agents such as water, and mixer to mix. The means for contacting polymer-solvent-deactivated catalyst mixture with an acid scavenger include, but are not limited to, one or more injection ports for acid scavenger and mixer to mix.

The one or more means for heating the polymer-solvent-acid mixture include, but are not limited to, any heat exchanger. The one or more means for heating is in communication with the one or more reactors via the one or more means for conveying of the polymer-solvent-catalyst mixture.

The means for conveying the heated polymer-solvent-acid mixture include, but are not limited to, pipes, tubes, and conduits, and can include a conveying device, e.g. screw pump. The one or more means for removing at least 60 percent of the solvent from the heated polymer-solvent-acid mixture, whereby a polymer-reduced solvent-acid mixture is formed, include, but are not limited to, a devolatilizer such as a drum with a gear pump to remove the polymer phase. The one or more means for removing at least 60 percent of the solvent is in communication with the one or more means for heating.

The one or more means for removing substantially the remaining portion of the solvent from the polymer-reduced solvent-acid mixture, whereby a solvent-acid mixture is formed, include, but are not limited to, a devolatilizer such as a drum with a gear pump to remove the polymer phase. The one or more means for removing substantially the remaining portion of the solvent is in communication with the one or more means for removing at least 60 percent of the solvent.

The one or more means for removing the acid from the solvent-acid mixture; whereby a substantially acid free solvent is formed, include, but are not limited to, a condenser. Condensing units may comprise a cooling exchanger, such as shell and tube or spiral exchanger, and a packed bed direct contact cooling. The one or more means for removing the acid is in communication with the one or more means for removing substantially the remaining portion of the solvent.

The one or more means for removing the substantially acid free solvent include, but are not limited to, a condenser. Condensing units may comprise a cooling exchanger, such as shell and tube or spiral exchanger, and a packed bed direct contact cooling. The one or more means for removing the substantially acid free solvent is in communication with the one or more means for removing the acid.

The inventive process for olefin polymerization commences with polymerizing one or more olefin monomers in the presence of one or more catalyst systems and one or more solvents to produce a polymer-solvent-catalyst mixture in one or more reactors. The polymer-solvent-catalyst mixture is then conveyed from the one or more reactors to a polymer separation and recovery system. Before the polymer-solvent-catalyst mixture reaches the polymer separation and recovery system, the one or more catalyst systems in the mixture are deactivated, and the mixture is contacted with one or more acid scavengers such as Calcium Stearate; thus forming, for example, Stearic Acid as a by-product. The mixture containing polymer products, solvents, and one or more acids, e.g. Stearic Acid, are heated via, for example, a heat exchanger, and then transferred to a first devolatilizer, wherein at least 60 percent of the solvent is removed from the heated polymer-solvent-acid mixture; thus forming a polymer-reduced solvent-acid mixture, i.e. containing less than 40 percent by weight, for example from 10 to 40 percent by weight of solvent. The polymer-reduced solvent-acid mixture is then transferred to a second devolatilizer, wherein a substantial remaining portion, i.e. greater than 99 percent by weight of the remaining amount of the solvent and the acid, in the vapor form, is removed from the polymer-reduced solvent-acid mixture; thus, forming a solvent-acid mixture. The polymer is recovered, and pelletized.

The solvent-acid mixture, in the form of vapor, is conveyed to a first condenser, wherein the acid, e.g. Stearic Acid, is removed from the solvent-acid mixture by cooling the mixture to a temperature in the range of less than the condensation point but above the crystallization point of the acid, e.g. Stearic Acid, in the mixture, for example, at a temperature in the range of from 7 to 12° C. at a pressure in the range of from 11 mbar to 16 mbar; thus forming a substantially acid free solvent, i.e. less than 1 percent by weight of acid. Condensing units may comprise a cooling exchanger, such as shell and tube or spiral exchanger, and a packed bed direct contact cooling.

The inventive system and process for olefin polymerization employs partial condensation to produce high purity polymers as such polymers exit the pelletizing step immediately following the polymerization process. In the first condenser, a cold recycled hydrocarbon solvent, about −10° C., is sprayed onto a packing surface to desuperheat the solvent-acid mixture vapor to the saturation temperature. As the solvent-acid mixture condenses, liquid droplets are formed and the acid, e.g. Stearic Acid, condenses into liquid droplets and onto the packing surface area. The packing surface area provides residence time and a place for the Stearic Acid to condense. The highly concentrated Stearic Acid condensation is then washed into high Stearic Acid stream to a solvent purge location.

The substantially acid free solvent in the form of vapor is then conveyed to the second condenser wherein the remaining solvent is removed by cooling the substantially acid free solvent vapor to a temperature in the range of from −1 to −20° C., for example, from −5 to −10° C. At least a portion of the substantially acid free solvent, for example at least 50 percent by weight, is recycled back into the process for olefin polymerization. The first and second condensers and the second devolatilizer are in fluid communications with each other. Requiring a first condenser and a second condenser allows the second condenser to operate at much lower temperatures; thus, lower vacuum pressures are required to remove the solvent-acid mixture from the devolatilizer. The lower vacuum pressures is important because lower vacuum pressures facilitate the recovery of a polymer with higher purity levels, e.g. lower solvent content, as the polymer exits the polymer recovery system, which is then pelletized. The one or more olefin polymers prepared according to the present invention have less than 800 parts by weight of one or more volatile organic compounds, e.g. one or more solvents, based on one million parts of the polymer, for example, from 400 to 800 parts by weight of one or more volatile organic compounds, e.g. one or more solvents, based on one million parts of the polymer.

In a first embodiment, all raw materials (e.g. ethylene, 1-octene) and the process solvent (a narrow boiling range high-purity isoparaffinic solvent trademarked Isopar E commercially available from ExxonMobil Corporation) are purified with molecular sieves before introduction into the reaction environment. Hydrogen is supplied in pressurized cylinders as a high purity grade and is not further purified. The reactor monomer feed (e.g. ethylene) stream is pressurized via mechanical compressor to above reaction pressure at 525 psig. The solvent and comonomer (e.g. 1-octene) feed is pressurized via mechanical positive displacement pump to above reaction pressure at 525 psig. The individual catalyst components are manually batch diluted to specified component concentrations with purified solvent (Isopar E) and pressured to above reaction pressure at 525 psig. All reaction feed flows are measured with mass flow meters and independently controlled with computer automated valve control systems.

The continuous solution polymerization reactor can consist of a liquid full, non-adiabatic, isothermal, circulating, and independently controlled loop. The reactor has independent control of all fresh solvent, monomer, comonomer, hydrogen, and catalyst component feeds. The combined solvent, monomer, comonomer and hydrogen feed to the reactor is temperature controlled to anywhere between 5° C. to 50° C. and typically 25° C. by passing the feed stream through a heat exchanger. The fresh comonomer feed to the polymerization reactor is fed in with the solvent feed. The total fresh feed to each polymerization reactor is injected into the reactor at one or more locations with roughly equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with optionally no contact time prior to the reactor. The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining substantial isothermal reaction environment at the specified temperature. Circulation around each reactor loop is provided by a screw pump.

The effluent from the polymerization reactor (containing solvent, monomer, comonomer, hydrogen, catalyst components, and molten polymer) exits the reactor loop, and as the stream exits the reactor, it is contacted with one or more catalyst deactivating agents and/or acid scavengers. Various additives such as anti-oxidants are added to the polymer stream. The stream then goes through another set of static mixing elements to evenly disperse the one or more catalyst deactivating agents and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatization system where the polymer is removed from the solvent, hydrogen, and unreacted monomer and comonomer. The recycled stream is purified, via a first and a second condenser in fluid communication with the second devolatilizer, before entering the reactor again. The separated and devolatized polymer melt is pumped through a die specially designed for underwater pelletization, cut into uniform solid pellets, dried, and transferred into a hopper. The polymer properties are then validated.

In a second embodiment, all raw materials (one or more olefin monomers) and the process solvent (e.g. a narrow boiling range high-purity isoparaffinic solvent commercially available under the tradename Isopar E from ExxonMobil Corporation) are purified with molecular sieves before introduction into the reaction environment. Hydrogen is supplied in pressurized cylinders as a high purity grade and is not further purified. The reactor monomer feed (e.g. ethylene) stream is pressurized via mechanical compressor to a pressure that is above the reaction pressure, approximate to 750 psig. The solvent and comonomer (e.g. 1-octene) feed is pressurized via mechanical positive displacement pump to a pressure that is above the reaction pressure, approximately 750 psig. The individual catalyst components are manually batch diluted to specified component concentrations with purified solvent (Isopar E) and pressurized to a pressure that is above the reaction pressure, approximately 750 psig. All reaction feed flows are measured with mass flow meters, independently controlled with computer automated valve control systems.

The one or more continuous solution polymerization reactors can consist of two or more liquid full, non-adiabatic, isothermal, circulating, and independently controlled loops operating, for example, in a series or parallel configuration. Each reactor can have independent control of all fresh solvent, monomer, comonomer, hydrogen, and catalyst component feeds. The combined solvent, monomer, comonomer and hydrogen feed to each reactor is independently temperature controlled to anywhere from 5° C. to 50° C. and typically 40° C. by passing the feed stream through a heat exchanger. The fresh comonomer feed to the polymerization reactors can be manually aligned to add comonomer to one of three choices: the first reactor, the second reactor, or the common solvent and then split between both reactors proportionate to the solvent feed split. The total fresh feed to each polymerization reactor is injected into the reactor at one or more locations per reactor roughly with equal reactor volumes between each injection location. The fresh feed is controlled typically with each injector receiving half of the total fresh feed mass flow. The catalyst components are injected into the polymerization reactor through specially designed injection stingers and are each separately injected into the same relative location in the reactor with optionally no contact time prior to the reactor.

The primary catalyst component feed is computer controlled to maintain the reactor monomer concentration at a specified target. The two cocatalyst components are fed based on calculated specified molar ratios to the primary catalyst component. Immediately following each fresh injection location (either feed or catalyst), the feed streams are mixed with the circulating polymerization reactor contents with static mixing elements. The contents of each reactor are continuously circulated through heat exchangers responsible for removing much of the heat of reaction and with the temperature of the coolant side responsible for maintaining substantial isothermal reaction environment at the specified temperature. Circulation around each reactor loop is provided by a screw pump. The effluent from the polymerization reactor (containing solvent, monomer, comonomer, hydrogen, catalyst components, and molten polymer) exits the reactor loop, and as the stream exits the reactor, it is contacted with one or more catalyst deactivating agents and/or acid scavengers. Various additives such as anti-oxidants are added to the polymer stream. The stream then goes through another set of static mixing elements to evenly disperse the one or more catalyst deactivating agents and additives.

Following additive addition, the effluent (containing solvent, monomer, comonomer, hydrogen, catalyst components, and molten polymer) passes through a heat exchanger to raise the stream temperature in preparation for separation of the polymer from the other lower boiling reaction components. The stream then enters a two stage separation and devolatilization system where the polymer is removed from the solvent, hydrogen, and unreacted monomer and comonomer. The recycled stream is purified, via a first and a second condenser in fluid communication with the second devolatilizer, before entering the reactor again. The separated and devolatized polymer melt is pumped through a die specially designed for underwater pelletization, cut into uniform solid pellets, dried, and transferred into a hopper. The polymer properties are then validated.

EXAMPLES

The following examples illustrate the present invention but are not intended to limit the scope of the invention. The examples of the instant invention demonstrate that present invention provides a polymer recovery at higher purity levels, e.g. lower solvent content, as the polymer exits the polymer recovery system, and then pelletized.

Example #1

All raw materials (ethylene, 1-octene) and the process solvent (a narrow boiling range high-purity isoparaffinic solvent trademarked Isopar E commercially available from Exxon-Mobil Corporation) were purified with molecular sieves before introduction into the reaction environment. Hydrogen was supplied in pressurized cylinders as a high purity grade and was not further purified. The reactor monomer feed (ethylene) stream was pressurized via mechanical compressor to above reaction pressure at 525 psig. The solvent and comonomer (1-octene) feed was pressurized via mechanical positive displacement pump to above reaction pressure at 525 psig. The individual catalyst components were manually batch diluted to specified component concentrations with purified solvent (Isopar E) and pressured to above reaction pressure at 525 psig. All reaction feed flows were measured with mass flow meters and independently controlled with computer automated valve control systems.

The continuous solution polymerization reactor consisted of a liquid full, non-adiabatic, isothermal, circulating, and independently controlled loop. The reactor had independent control of all fresh solvent, monomer, comonomer, hydrogen, and catalyst component feeds. The combined solvent, monomer, comonomer and hydrogen feed to the reactor was temperature controlled to anywhere between 5° C. to 50° C. by passing the feed stream through a heat exchanger. The fresh comonomer feed to the polymerization reactor was fed in with the solvent feed. The total fresh feed to each polymerization reactor was injected into the reactor at two locations with roughly equal reactor volumes between each injection location. The fresh feed was controlled typically with each injector receiving half of the total fresh feed mass flow. The catalyst components were injected into the polymerization reactor through specially designed injection stingers and were each separately injected into the same relative location in the reactor with no contact time prior to the reactor. The primary catalyst component feed was computer controlled to maintain the reactor monomer concentration at a specified target. The two cocatalyst components were fed based on calculated specified molar ratios to the primary catalyst component. Immediately following each fresh injection location (either feed or catalyst), the feed streams were mixed with the circulating polymerization reactor contents with static mixing elements. The contents of each reactor were continuously circulated through heat exchangers responsible for removing much of the heat of reaction and with the temperature of the coolant side responsible for maintaining substantial isothermal reaction environment at the specified temperature. Circulation around each reactor loop was provided by a screw pump.

The effluent from the polymerization reactor (containing solvent, monomer, comonomer, hydrogen, catalyst components, and molten polymer) exits the reactor loop, and as the stream exits the reactor, it is contacted with water, as the catalyst deactivating agent, and Calcium Stearate. In addition, various additives, such as anti-oxidants, were added to the polymer stream. The stream then went through another set of static mixing elements to evenly disperse the catalyst deactivating agent and additives. A control valve was employed to maintain a liquid phase during the catalyst deactivation and heating periods.

Following additive addition, the effluent (containing solvent, monomer, comonomer, hydrogen, catalyst components, and molten polymer) passed through a heat exchanger to raise the stream temperature in preparation for separation of the polymer from the other lower boiling reaction components. The stream then entered a two stage separation and devolatization system where the polymer was removed from the solvent, hydrogen, and unreacted monomer and comonomer. The recycled stream was purified, via a first and a second condenser in fluid communication with the second devolatilizer, before entering the reactor again. The separated and devolatized polymer melt was pumped through a die specially designed for underwater pelletization, cut into uniform solid pellets, dried, and transferred into a hopper. The polymer properties were then validated. The polymer product contained less than 800 parts of volatile organic compounds per one million parts of polymer, measured via headspace gas chromatography.

We claim:
1. An olefin polymerization system comprising:
 (a) one or more reactors for polymerizing one or more olefin monomers in the presence of one or more catalyst systems and solvent to produce a polymer-solvent-catalyst mixture;

(b) one or more first conduits for conveying said polymer-solvent-catalyst mixture; wherein said one or more conduits for conveying said polymer-solvent-catalyst mixture further provide first injection ports for deactivating said catalyst in said polymer-solvent-catalyst mixture and second injection ports for contacting said polymer-solvent-deactivated catalyst mixture with an acid scavenger, whereby a polymer-solvent-acid mixture is formed;

(c) one or more heat exchanger for heating said polymer-solvent-acid mixture, wherein said one or more heat exchangers for heating is in communication with said one or more reactors via said one or more first conduits for conveying of said polymer-solvent-catalyst mixture;

(d) one or more second conduits and optionally one or more screw pumps for conveying said heated polymer-solvent-acid mixture;

(e) one or more first devolatilizers for removing at least 60 percent of said solvent from said heated polymer-solvent-acid mixture, whereby a polymer-reduced solvent-acid mixture is formed, and wherein said one or more first devolatilizers for removing at least 60 percent of said solvent is in communication with said one or more heat exchangers for heating;

(f) one or more second devolatilizers for removing substantially the remaining portion of the solvent and acid from said polymer-reduced solvent-acid mixture, whereby a solvent-acid mixture is formed, and wherein said one or more second devolatilizers for removing substantially the remaining portion of said solvent is in communication with said one or more first devolatilizers for removing at least 60 percent of said solvent;

(g) one or more first condensers for removing said acid from the solvent-acid mixture; whereby a substantially acid free solvent is formed, and wherein said one or more first condensers for removing said acid is in communication with said one or more second devolatilizers for removing substantially the remaining portion of said solvent; and (h) one or more second condensers for removing said substantially acid free solvent in communication with the one or more first condensers for removing said acid.

2. A process for olefin polymerization comprising the steps of:

polymerizing one or more olefin monomers in the presence of one or more catalyst systems and a solvent to produce a polymer-solvent-catalyst mixture in one or more reactors;

deactivating said one or more catalyst systems in said polymer-solvent-catalyst mixture;

contacting said polymer-solvent-deactivated catalyst mixture with an acid scavenger;

thereby forming a polymer-solvent-acid mixture;

heating said polymer-solvent-acid mixture;

removing at least 60 percent of said solvent from said heated polymer-solvent-acid mixture;

thereby forming a polymer-reduced solvent-acid mixture;

removing substantially the remaining portion of the solvent and acid from said polymer-reduced solvent-acid mixture;

thereby forming a solvent-acid mixture;

removing said acid from the solvent-acid mixture;

thereby forming a substantially acid free solvent;

removing said substantially acid free solvent;

recycling at least a portion of said substantially acid free solvent back into said process for olefin polymerization; and thereby forming an olefin polymer having less than 800 parts by weight of volatile organic compounds based on one million parts of said polymer.

\* \* \* \* \*